United States Patent
Patki (10) Patent No.: US 10,671,763 B2
(45) Date of Patent: Jun. 2, 2020

(54) PROTECTING CIRCUITS FROM HACKING USING A DIGITAL RESET DETECTOR

(71) Applicant: Nvidia Corporation, Santa Clara, CA (US)

(72) Inventor: Padmanabham Patki, Santa Clara, CA (US)

(73) Assignee: Nvidia Corporation, Santa Clara, CA (US)

( * ) Notice: Subject to any disclaimer, the term of this patent is extended or adjusted under 35 U.S.C. 154(b) by 0 days.

(21) Appl. No.: 16/214,689

(22) Filed: Dec. 10, 2018

(65) Prior Publication Data

US 2020/0143090 A1 May 7, 2020

Related U.S. Application Data

(60) Provisional application No. 62/754,392, filed on Nov. 1, 2018.

(51) Int. Cl.
*G06F 21/75* (2013.01)
*H03K 19/003* (2006.01)
*H03K 19/20* (2006.01)

(52) U.S. Cl.
CPC .......... *G06F 21/75* (2013.01); *H03K 19/003* (2013.01); *H03K 19/20* (2013.01)

(58) Field of Classification Search
None
See application file for complete search history.

(56) References Cited

U.S. PATENT DOCUMENTS

| | | |
|---|---|---|
| 4,419,596 A | 12/1983 | Kikuchi |
| 6,674,681 B2 | 1/2004 | Ishikuri |
| 6,762,632 B1 | 7/2004 | Himpe et al. |
| 7,030,649 B1 * | 4/2006 | Balasubramanian .. G01K 7/015 326/32 |

(Continued)

FOREIGN PATENT DOCUMENTS

| | | |
|---|---|---|
| CN | 103095265 B | 1/2015 |
| EP | 1014251 B1 | 10/2005 |
| WO | 2018086375 A1 | 5/2018 |

OTHER PUBLICATIONS

"Digital Signal Controller"; User Manual; http://www.freescale.com; DSP5625XUM, Rev. 4; Jul. 2005; 166 pgs.

(Continued)

*Primary Examiner* — Crystal L Hammond (57) ABSTRACT

Computing devices are now used for various purposes ranging from monitoring a refrigerator to driving automobiles. Protecting the data and logic within the chips of the computing devices is essential to ensure reliable operation. When a particular partition of a chip is powered-up but the logic of the partition is not reset, the logic will be in an unpredictable random state. To operate in a secure environment, it is necessary to start the operation of the logic from a known state and not a random state. To ensure the logic is operating in a secure environment, a digital reset detector circuit (DRDC) is provided that indicates if the logic was reset after power-up. The DRDC can ensure chips are secure from attacks involving reset deprivation upon power-up and help protect various secure and secret assets in a chip, including customer keys.

22 Claims, 7 Drawing Sheets

(56) References Cited

U.S. PATENT DOCUMENTS

| | | |
|---|---|---|
| 7,400,179 B2 | 7/2008 | Lin |
| 7,522,201 B2 | 4/2009 | Demonte et al. |
| 7,701,265 B2 | 4/2010 | Meada |
| 7,746,131 B2 | 6/2010 | Chan et al. |
| 7,965,113 B2 | 6/2011 | Fuller |
| 8,196,215 B2 | 6/2012 | Dewar |
| 9,081,556 B2 | 7/2015 | Paaske et al. |
| 9,310,862 B2 | 4/2016 | Cabler et al. |
| 9,377,497 B2 | 6/2016 | Sievers et al. |
| 9,998,112 B1 | 6/2018 | Chang et al. |
| 2006/0261868 A1 | 11/2006 | Ju et al. |
| 2007/0150730 A1* | 6/2007 | Conti .............. G06F 1/3287 713/166 |
| 2011/0087835 A1* | 4/2011 | Sato ............ G11C 11/40618 711/106 |
| 2016/0006786 A1* | 1/2016 | Mitola, III ......... G06F 21/56 709/203 |
| 2017/0060669 A1* | 3/2017 | Rohleder ........... G06F 11/079 |
| 2019/0332465 A1* | 10/2019 | Jones ................. G11C 7/10 |

OTHER PUBLICATIONS

"AVR 8-bit Microcontrollers"; Atmel; Datasheet Advance Information; Jul. 2016; 137 pgs.

Burdia, et al.; "Power-on Reset Circuit for SoC with multiple I/O Power Supplies"; Topic: B, Presentation: P; undated; 2 pgs.

* cited by examiner

PROTECTING CIRCUITS FROM HACKING USING A DIGITAL RESET DETECTOR

CROSS-REFERENCE TO RELATED APPLICATION

This application claims the benefit of U.S. Provisional Application Ser. No. 62/754,392, filed by Padmanabham Patki on Nov. 1, 2018, entitled "PROTECTING CIRCUITS FROM HACKING USING A DIGITAL RESET DETECTOR," commonly assigned with this application and incorporated herein by reference in its entirety.

TECHNICAL FIELD

This application is directed, in general, to protecting integrated circuits from hacking and, more specifically, to preventing attacks that leverage reset deprivation and power-cycling to hack a system.

BACKGROUND

System-on-chips (SoCs) have multiple power domains and reset domains. When a particular partition of a SoC is powered up but not reset, the logic in that partition will be in an unpredictable random state. To operate in a secure environment, it is necessary to start the operation from a known state and not a random state.

Some power-on-reset (POR) circuits or logic have been attempted to provide protection. However, these attempts rely heavily on analog characteristics to generate the duration of a reset pulse as well as the time when the reset pulse is asserted. This makes the logic susceptible to attacks where an attacker can control the slew-rate of the power supply and thus either cause the reset pulse to be generated too early during the power ramp-up or by ensuring a very short duration of the reset pulse which cannot propagate through the logic to effectively reset the chip.

Other attempted solutions rely on sequential elements (e.g. counters) containing a well-defined value ('0') upon power up to generate a POR pulse. Thus, these solutions are susceptible to the very attack they are trying to mitigate while implementing the POR Circuit. There have also been attempts to design POR circuits where reset remains asserted until a specific voltage threshold is reached. However, such circuits are susceptible to attacks with a fast ramp-up rate if the threshold to de-assert reset is low. Also, if the threshold to de-assert reset is too low, this can cause reset de-assertion even before logic is truly powered up. If the threshold voltage to de-assert reset is increased, this can result in erroneous resets during dynamic voltage and frequency scaling (DVFS).

SUMMARY

In one aspect, the disclosure provides a digital reset detector circuit (DRDC) for an integrated circuit. In one embodiment, the DRDC includes: (1) a parallel array of memory elements that each have a data output, a corresponding data input, and a reset input, and are arranged to provide a reset value at the data outputs in response to receiving a reset signal at the reset inputs, and (2) combinational logic having a first input connected to each of the data outputs and a second input connected to a fixed value, wherein the combinational logic provides a first output value indicating a secure reset status when the reset value and the fixed value are the same, and the combinational logic outputs a second output value indicating an unsecure reset status when the reset value and the fixed value are not the same.

In another aspect, an integrated circuit is disclosed. In one embodiment the integrated circuit includes: (1) circuitry within a power domain of the integrated circuit and configured to perform a function, (2) a secure memory element configured to control access to the circuitry, the secure memory element having a security output and a reset input configured to receive a reset signal, (3) a protection logic element having a first input coupled to the security output of the secure memory element and a protection output coupled to the circuitry; and (4) a DRDC having (4A) a parallel array of memory elements that each have a data output, a corresponding data input, and a reset input, and are arranged to provide a reset value at the data outputs in response to receiving the reset signal at the reset inputs, and (4B) combinational logic having a first input connected to each of the data outputs, a second input connected to a fixed value, and an output coupled to a second input of the protection logic element, wherein the fixed value is the same as the reset value and the combinational logic provides a reset status at the output that indicates if the reset signal was received after a power up of the power domain.

In yet another aspect, the disclosure provides a method of protecting logic of an integrated circuit from reset deprivation attacks at power-up. In one embodiment the method includes: (1) receiving a power-up signal to power-up a power domain of the integrated circuit, (2) comparing an output value from an array of memory elements of a digital reset detector circuit to a fixed value, and (3) generating a reset status based on the comparing, wherein the reset status indicates the logic was reset after power-up when the output value and the fixed value are the same, and the reset status indicates the logic was not reset after power-up when the output value and the fixed value are different.

BRIEF DESCRIPTION

Reference is now made to the following descriptions taken in conjunction with the accompanying drawings, in which.

DETAILED DESCRIPTION

As stated above it is necessary to start the operation of a chip from a known state and not a random state in order to operate in a secure environment. Power-cycling logic and depriving it of reset after power up may cause the logic to contain random values. When such random logic is responsible for enforcing security of the chip, the security of the chip becomes vulnerable based on the permutations that can break the security model. Typically, after power-up, a known state of the chip is ensured by toggling reset to the logic that has been powered on. This ensures that the logic is in a known reset state. However an attacker might prevent the logic inside the chip from receiving a reliable reset after power up via different means. Hence the ability to detect whether a chip is in a known state or a random state is needed for protection.

As such, the disclosure provides a digital reset detector block that protects a chip from attacks, such as reset deprivation attacks at power-up. The digital reset detector block, also referred to herein as a digital reset detector circuit, provides the ability for on-chip logic to detect whether or not it was reset after power up. This ability helps prevent reset deprivation attacks that rely on random states of a chip to compromise the security perimeter and secure assets within the chip.

The digital reset detector circuit relies on the same principle that a hacker uses to exploit a reset deprived system and uses it against the hacker. That is, the digital reset detector circuit relies on the fact that upon power up, if logic has been deprived of reset, the logic will be in a random state. Thus the digital reset detector circuit generates an output value and compares the output value to a fixed value. The fixed value is a predetermined pattern of bits with equal number of 0s and is that can distributed in a random or pseudo-random manner. Examples of fixed value for a 8-bit pattern are: b'10110100, b'01100101, b'00101101, etc. For a 4-bit pattern, examples include: b'1010, b'0101, b0110, etc. If the digital reset detector circuit was reset, then the output value and the fixed value will match and a favorable reset status indicating the reset is generated. The reset status is secure when a reset is performed after power-up and unsecure when the reset is not performed.

The digital reset detector circuit is a non-scannable reset detector for a power domain or domains of a chip that provides an output, the reset status, via pure combinational logic. The reset status can be used to mask the inputs and outputs of secure assets or controls governing Roots of Trust (RoT) of secure logic in the chip that are vulnerable to reset deprivation attacks. Security logic controlling JTAG chains are an example of a feature that relies on a known state to prevent an attacker for gaining access to secure assets within a chip via JTAG. The digital reset detector circuit can vary in size or width in correspondence with the fixed value used for comparison. For example, a fixed value can be 128 bits, 256 bits, 512 bits or other sizes depending on the security requirement.

The number of memory elements can be selected based on entropy requirement for a system to be considered secure. Entropy requirement for the memory elements is the lack of predictability (low probability) required to ensure that the probability that the memory elements having random value, in absence of reset, match the reset value is less-than-or-equal-to the probability of guessing the secure asset (or secret) in the system. The number of memory elements can be increased or reduced based on the characteristics of logic cells in order to achieve sufficiently low. For example, let "p" be the probability of an output of a memory element being "1" in a reset deprived state upon power up. Thus, probability of a memory element output being "0" in a reset deprived state upon power up is "1-p". Let "V" be a binary number consisting of 2n bits with equal number of "0"s and "F"s. Assume 2n number of memory elements in an ordered parallel arrangement. The probability, P, that upon power up and in a reset deprived state, the combined parallel output of the memory elements will be equivalent to the value, "V", is:

$$P_n = p^n x (1-p)^n$$

For a particular value of "n", the max value of P is when $p=1-p$. Thus, $P_n(max)=0.5^{2n}$.

Using flip-flops as an example of the memory elements, if a technology has a bias towards driving more "0"s as compared to "1"s, then the ratio between p and 1−p will be skewed. The larger the skew, the lower the number of bits required to create an equivalent low probability. For example, if p=0.5, then for 2n=10, we have $P_{10(p=0.5)}=9.8e-4$. If p=0.1, then for 2n=10, we have $P_{10(p=0.1)}=5.9e-6$ whereas $P_{6(p=0.1)}=7.3e-4$. Thus, for the same acceptable probability, the number of bits required is much less when the p/1−p ratio is skewed. As such, 'n' may be optimized (reduced) if technology bias of the memory elements driving a greater number of zeros or ones is known to be skewed. 'n' is selected such that the value of 'P' is less-than-or-equal-to the probability of guessing the secure asset or secret (e.g. secure keys) in the system. Thus, for example, if the system is using 256-bit keys, 'P' must be less-than-or-equal-to $2^{-256}e-78$. Hence, if p=0.5, 'n' should be greater-than-or-equal-to 256-bits. This ensures that the entropy of the memory elements in DRDC is greater than the secure asset. If 'p' deviates from 0.5, a smaller 'n' can be chosen as long as the required small value of 'P' is satisfied. Also, if probability of an event is lower that the probability of an attacker guessing the secret (e.g. keys), then for all practical purposes, that probability is considered negligible for the system under concern.

Also, in a typical SoC, the digital reset detector circuit need not be implemented in every power domain. Instead, the digital reset detector circuit can be, or in some examples, should only be, instantiated in partitions that contain information critical to RoT and controls the core functionality of a chip, such as a SoC. Once RoT is established on the system, the RoT can then expand the secure perimeter via conventional security means, such as authentication.

Figure 1:
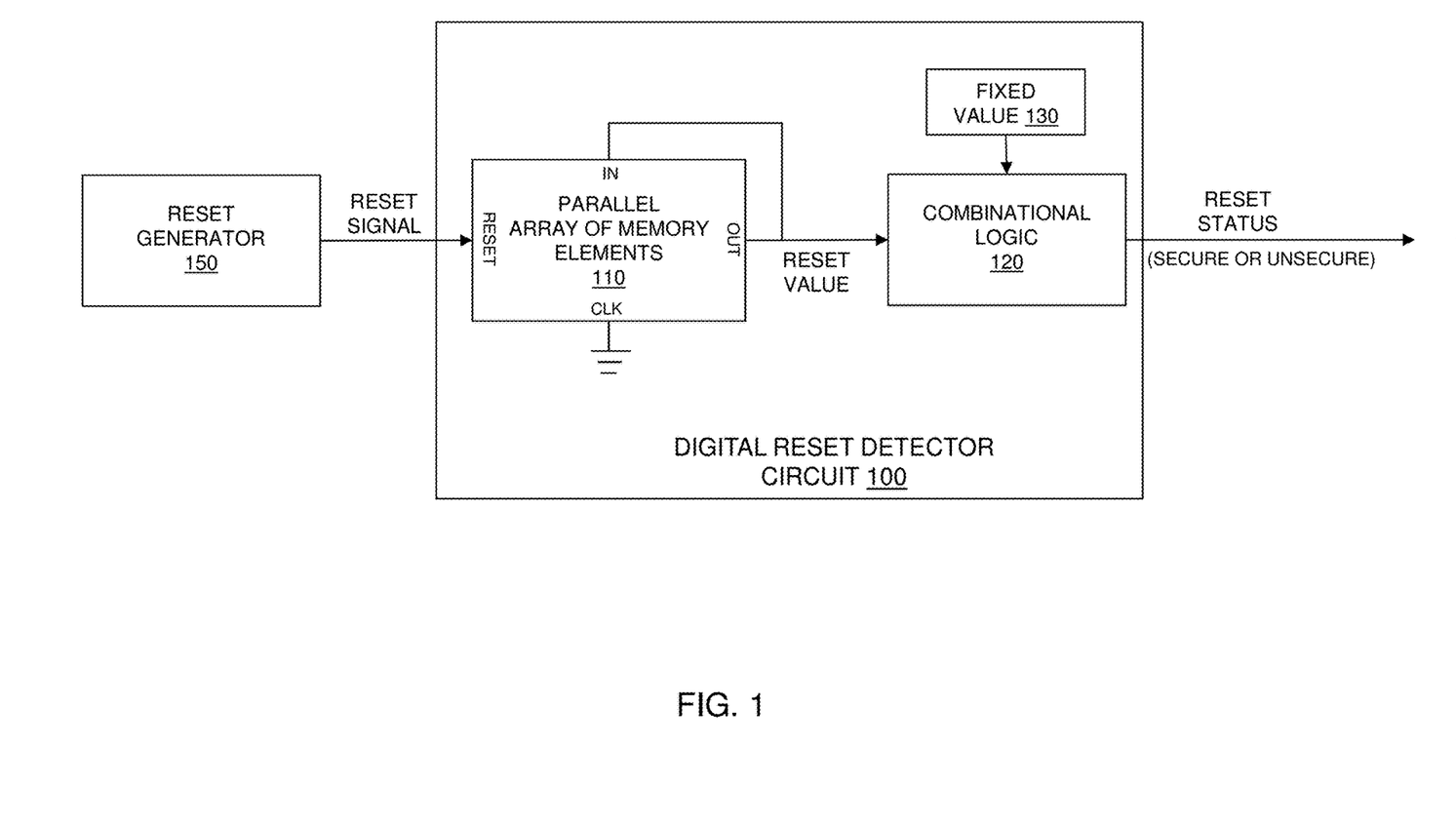
FIG. 1 illustrates a block diagram of an example of a digital reset detector circuit constructed according to the principles of the disclosure.
Figure 4:
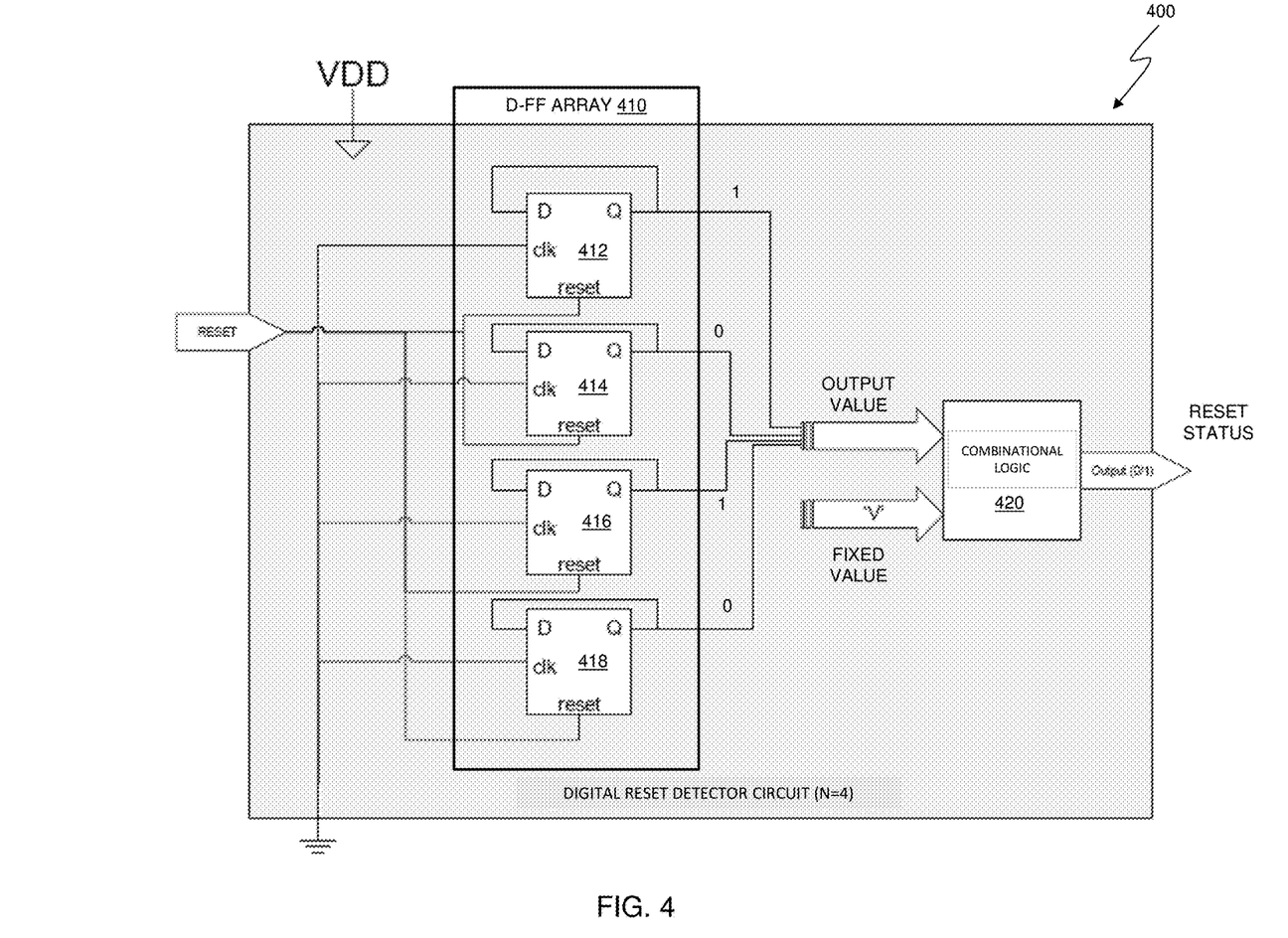
FIG. 4 illustrates a schematic diagram of an example of a digital reset detector circuit constructed according to the principles of the disclosure.

FIG. 1 illustrates a block diagram of an example of a digital reset detector circuit (DRDC) 100 constructed according to the principles of the disclosure. The DRDC 100 includes a parallel array of memory elements (PAME) 110, combinational logic 120, and a fixed value 130. Each of the PAME 110 have a data output, a corresponding data input, and a reset input, and are arranged to provide a reset value at the data outputs in response to receiving a reset signal at the reset inputs. The reset value is an expected sequence of outputs from the PAME 110 in response to receiving the reset signal; the reset value matches, i.e., is the same as the fixed value 130. FIG. 1 illustrates the example when the reset input is the reset signal and the data output or output value is the reset value. The reset signal can be an asynchronous signal. The memory elements can be in an ordered parallel arrangement. For example, each memory element has a known output when reset; memory element A with a high or "1" output when reset and memory element B with a low or "0" output when reset. The ordered parallel arrangement can be memory element A, memory element B, memory element A, memory element B, etc., wherein the reset value is a known alternating sequence of "1"s and "0"s that matches the fixed value 130. The memory elements can be D flip-flops. FIG. 4 provides an example, D-FF array 410, of an ordered parallel arrangement of memory elements.

Figure 7:
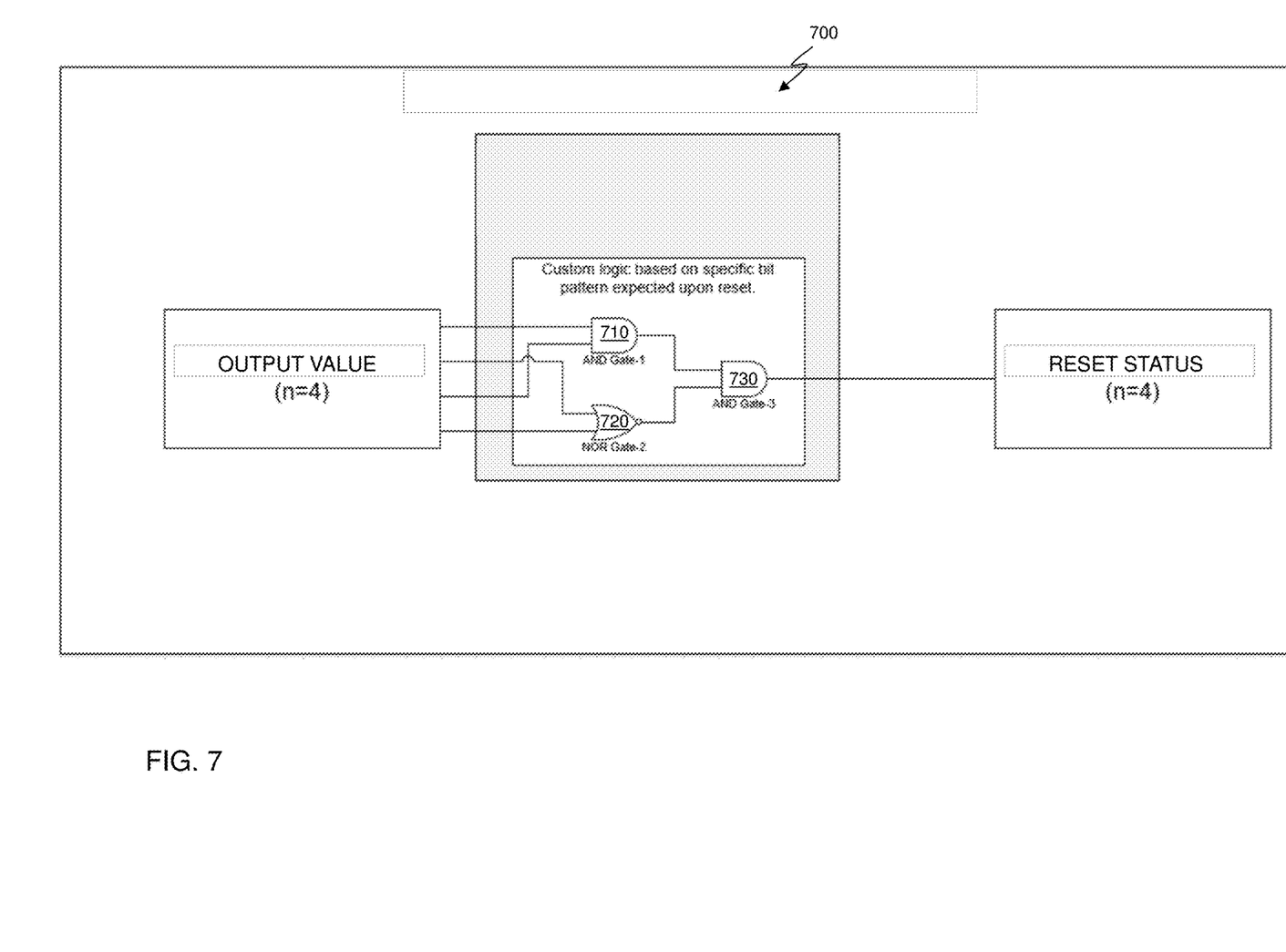

The combinational logic 120 has a first input connected to each of the data outputs of the PAME 110 and a second input connected to the fixed value 130. One way to implement the fixed value input is by tying the bits corresponding to '1's in fixed value input to VDD and those corresponding to '0's to GND. There are other ways to implement a fixed value source, too. For example, using SR or JK latches where the latch inputs are tied to VDD/GND or vice-versa depending on the specific fixed bit value the latch is expected to drive. Another way to implement the combinational comparator logic ingrains the fixed value in the logic itself as shown in FIG. 7 and hence does not need the fixed value as an explicit input. The reset value is the same as the fixed value. If the reset signal is not received by the PAME 110, then the PAME 110 provides another output, a random output, instead of the reset value. The combinational logic 120 generates a reset status based on the comparison between the output of the PAME 110 and the fixed value 130. The reset status indicates if a reset was received after power-up, i.e., logic is secure, or if a reset was not received after power-up, i.e., logic is not secure. In FIG. 1 since the PAME 110 output is the reset value that is the same as the fixed value 130, then the reset status is secure.

A reset generator 150 provides the reset signal to the DRDC 100. The reset generator 150 includes reset-capture-and-hold logic and can be a conventional reset generator typically included in integrated circuits. The reset signal is the reset that needs to be detected by the DRDC 100. The type of reset signal can vary for different DRDC implementations. A controller of a chip, also referred to herein as an integrated circuit, can direct operation of the reset generator 150 and initiate the generation of a reset signal.

Figure 2:
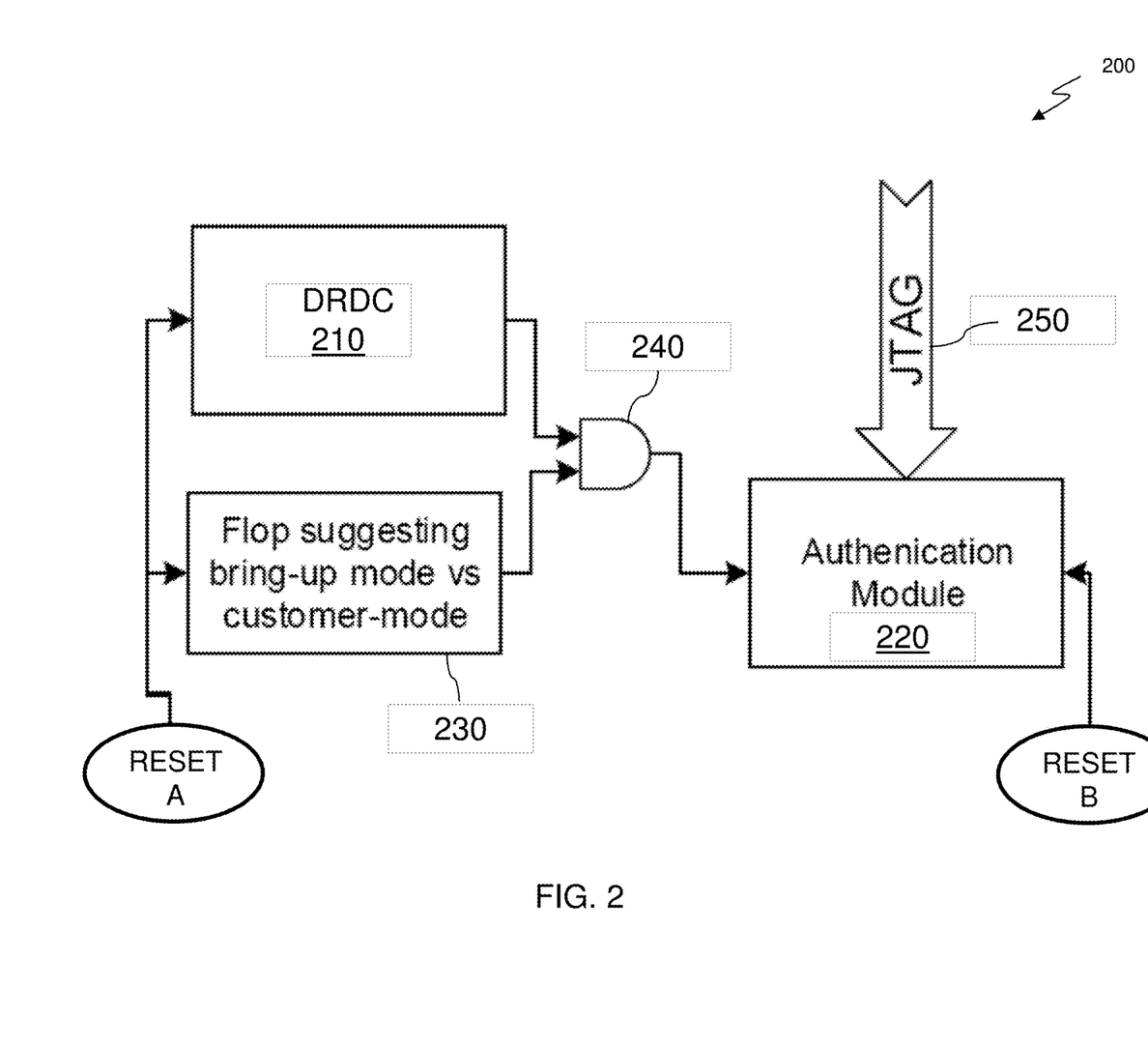
FIG. 2 illustrates a block diagram of an example of an integrated circuit having a digital reset detector circuit to protect logic of the integrated circuit from reset deprivation attacks upon power-up.

FIG. 2 illustrates a block diagram of an example of an integrated circuit 200 having a DRDC 210 to protect logic or circuitry (authentication module 220) of the integrated circuit 200 from reset deprivation attacks upon power-up. The integrated circuit 200 further includes a secure memory element 230, a protection logic element 240, and a JTAG chain 250. The integrated circuit 200 can be a SoC.

The DRDC 210 is configured to indicate if a reset signal was received after power-up, for example, reset signal A. The DRDC 210 can be the DRDC 100 of FIG. 1. The DRDC 210 is used to protect the authentication module 220 from reset deprivation attacks. The authentication module 220 includes secure features of the integrated circuit 200.

The secure memory element 230 controls access to the authentication module 220. The secure memory element 230 can be a clocked flip-flop that is used to control access via an internal development mode (i.e., bring-up mode) or production mode (i.e., customer mode). The protection logic element 240 is also configured to control access to the authentication module 220. When receiving a secure reset status from the DRDC 210 the protection logic element 240 can allow access to the authentication module 220, such as via the JTAG chain 250.

FIG. 2 provides an example of using a DRDC as disclosed herein to protect circuitry of an integrated circuit. Typically, the security perimeter of the integrated circuit 200 is relaxed during bring-up, also referred to as an internal development mode. However, when the integrated circuit 200 is released to customers, the security level is heightened. Consider a case where access via the JTAG chain 250 requires no authentication during internal development mode. However, after the integrated circuit 200 goes to customers, JTAG access requires authentication. The module that decides whether the integrated circuit 200 is in internal development mode stage or whether it is at a customer site relies on the value of the memory element 230. For example, when the output of the memory element 230 equals "1", access via unauthenticated JTAG is allowed, and when the output of the memory element 230 equals "0", only authenticated JTAG access is allowed. Thus, by depriving reset to the memory element 230 on power-up, an attacker can potentially cause unauthenticated JTAG access to be performed on the integrated circuit 200 when the random value of the memory element 230 is "1" (which can happen with a probability of typically around 40%-60%). However, if the output of the memory element 230 is masked with the output of the DRDC 210, this will prevent the value of the memory element 230 from allowing unauthenticated access via the JTAG chain 250 when an attacker has deprived the memory element 230 of its reset.

Figure 3:
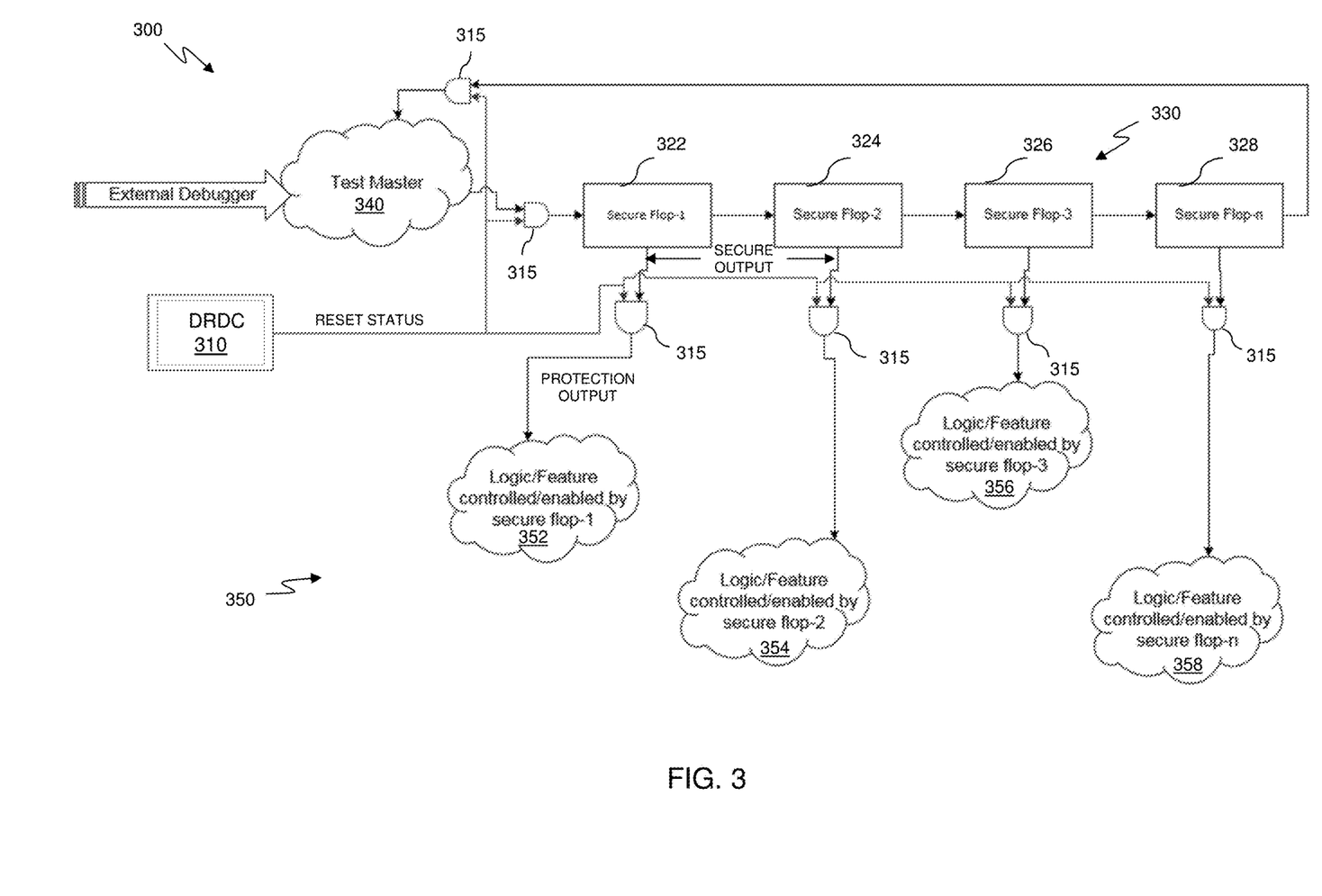
FIG. 3 illustrates a block diagram of an example of an integrated circuit having a digital reset detector circuit and a secure JTAG chain.

FIG. 3 illustrates a diagram of an example of a SoC 300 having a DRDC 310 and a secure JTAG chain. FIG. 2 illustrates using DRDC 210 to protect a single logic feature, authentication module 220. FIG. 3 illustrates how a single DRDC 310 can be connected to multiple protection logic elements 315 (e.g., AND gates in FIG. 3) that are each coupled to a different secure memory elements 322, 324, 326, or 328, (e.g., secure flops 1 to n in FIG. 3), and used to mask the data input to a secure scan chain 330. The SoC 300 also includes a test master 340 that is coupled to secure scan chain 330 via a protection logic element and receives inputs from an external debugger. The test master can be a JTAG TAP controller with additional custom logic for custom functionalities and security features. The external debugger and the test master 340 can be conventional devices. Also coupled to the secure scan chain 330 is logic circuitry, collectively referred to as logic circuitry 350. The logic circuitry 350 can be part of a power domain of the SoC 300. Different sections of the logic circuitry 350 are uniquely connected to and enabled by one of the secure memory elements 322, 324, 326, 328, of secure scan chain 330 via a corresponding protection logic element 315. Logic circuit 352 is controlled by secure memory element 322, logic circuit 354 is controlled by secure memory element 324, logic circuit 356 is controlled by secure memory element 326, and logic circuit 358 is controlled by secure memory element 328. The secure memory elements 322, 324, 334, 344, provide a security output to their corresponding protection logic element 315 to control access to the logic circuits 352, 354, 356, 358. The secure memory elements 322, 324, 334, 344 also include a reset input (not shown in FIG. 3) configured to receive a reset signal. The protection logic elements 315 have a first input coupled to the security output of the secure memory elements 322, 324, 326, 328, a second input coupled to the reset status received from the DRDC 310, and a protection output coupled to the logic circuits 352, 354, 356, 358.

In FIG. 3, the assumption is that the default/reset state of the secure memory elements 322, 324, 326, 328, is "0". Hence the "AND" gates are used as the protection logic elements 315 at their outputs to mask their outputs. If the default/reset state of the secure memory elements 320 had been "1", an "OR" gate would be used as the protection logic elements 315 for the parallel-output mask and connected an inverted mask control bit to the input of the OR-gate instead of a mask control bit to the input of the AND gate.

If RoT is distributed across multiple power domains of the SoC 300, DRDC 310 can be instantiated in each of the power domains and corresponding outputs of the DRDC 310 can be combined to create a comprehensive reset detector signal to protect the combined RoT. Alternatively, individual RoT can be protected using a respective DRDC.

FIG. 4 illustrates a schematic diagram of an example of a DRDC 400 constructed according to the principles of the disclosure. The DRDC 400 includes a parallel array of "N" D flip-flops (D-FF array 410) and combinational logic 420. The DRDC 400 is connected to an operating voltage $V_{DD}$ and ground. The DRDC 400 also receives an input, a reset signal, and generates an output, a reset status signal. The DRDC 400 can be for a power domain of an integrated circuit. In FIG. 4, N equals four.

Figure 6:
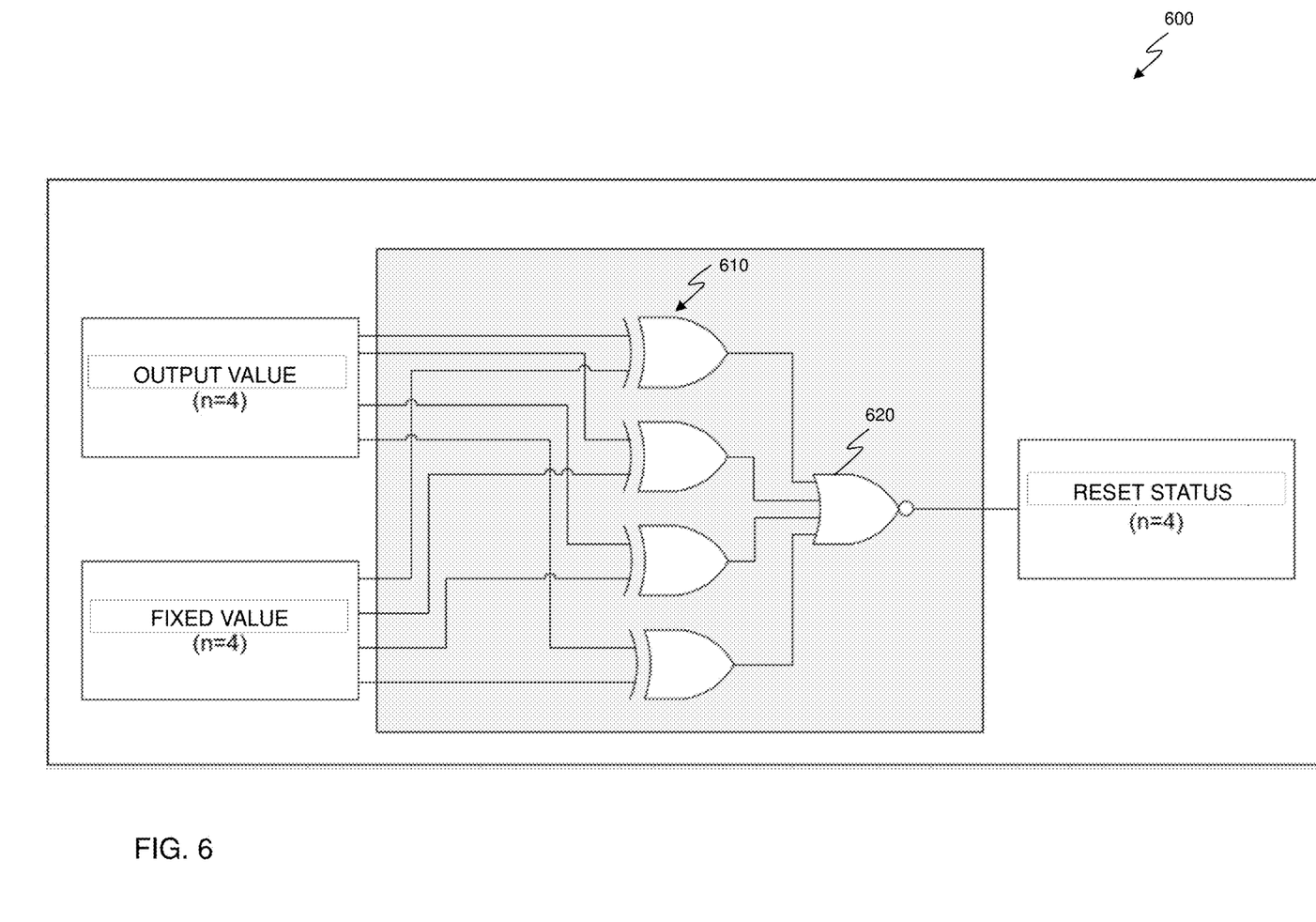
FIG. 6 and FIG. 7 provide examples of combinational logic that can be employed in the digital reset detector circuit.

The outputs of the D-FF array 410 are connected to their inputs and the clock inputs to D-FF array 410 can be tied low, e.g., connected to ground. The output of the D-FF array 410 is connected to one input of a combinational logic 420. The second input to the comparator 420 is a fixed value that is equal to a reset value of the D-FF array 410. The output of the combinational logic 420 is the output of the DRDC 400. In one embodiment, output of the combinational logic 420 is '1' when its two n-bit inputs match and '0' otherwise. Another embodiment of combinational logic 420 may also choose to have the opposite output polarity. Depending on the choice of output polarity the gates for masking logic would need to be chosen accordingly. FIG. 6 and FIG. 7 provide examples of combinational logic that can be employed for the combinational logic 420. The reset to the D-FF array 410 is the same reset that DRDC 400 needs to detect in order to drive "1" on its output, i.e., a secure reset status. In some embodiments, the reset value of the D-FF array 410 (and hence the fixed value to the second input of the comparator 420), "V", have an equal number of "0"s and "1"s.

The D flip-flops of the D-FF array 410 are in an ordered parallel arrangement that, when reset, generate a known reset value that is the same as the fixed value. For example, D flip-flops 412 and 416 are each a memory element A that provides a high or "1" output when reset, and D flip-flops 414 and 418 are each a memory element B that has a low or "0" output when reset. The ordered parallel arrangement of the D flip-flops of the D-FF array 410, therefore, provides a reset value that is an alternating sequence of "1"s and "0" s, "1010."

In this embodiment, if the output of DRDC 400 is "0", the output indicates that the logic in the power domain has been powered up; however the logic has not been reset post power up. Therefore, the reset status is unsecure. Hence the system could be in an unreliable state and susceptible to attack. If the output of DRDC 400 is "1", the output indicates that the logic in the power domain has received a reset after power up thus ensuring that the logic is not in an unreliable state. Thus, the reset status is secure.

The output of DRDC 400 can be used to mask various enable signals or accesses. This will prohibit the attacker from causing a chip to function in a non-secure state and also prevent the attacker from making unauthorized accesses. Thus secure assets within the chip will be protected.

As noted above N is 4 for the DRDC 400. In one example implementation, the number of D-flip flops in a parallel array is 512. Thus, if N=512, an example for the fixed value 'V' is:
'0x76543210FEDCBA98_0123456789ABCDEF_0F1E2 D3C4B5A6978_F0E1D2C3B4A59687_FEDCBA987654 3210_89ABCDEF0123456789_08192A3B4C5D6E7F_E FCDAB8967452301'.

Upon power up, the 512 bit output value will be random. Probability of this random value matching the reset value will be negligible. Hence the output of the DRDC 400 will be "0" until reset under concern is asserted to ensure that the logic is in a defined and secure state.

Figure 5:
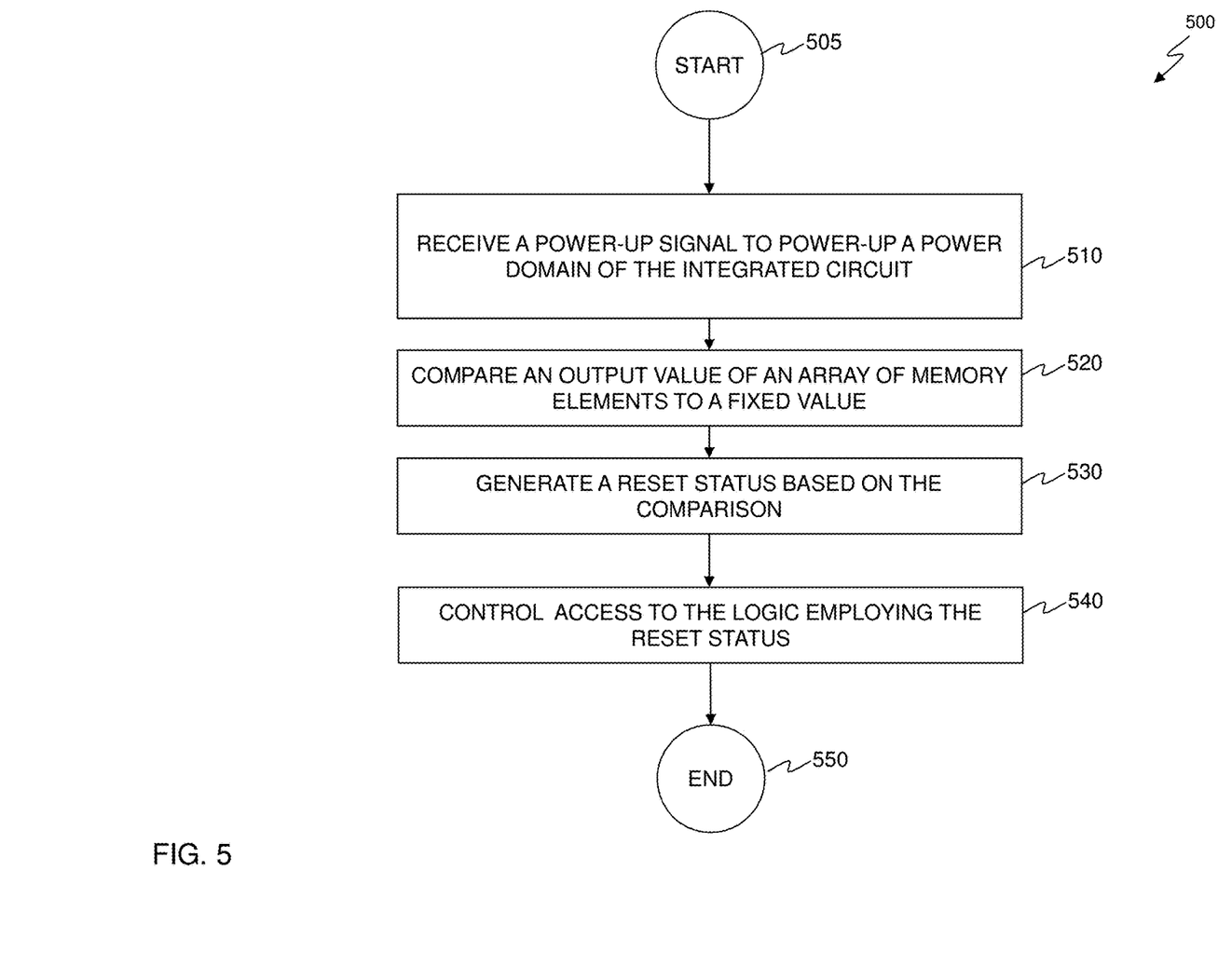
FIG. 5 illustrates a flow diagram of an embodiment of a method of protecting logic of an integrated circuit from reset deprivation attacks at power-up, carried out according to the principles of the disclosure.

FIG. 5 illustrates a flow diagram of an embodiment of a method 500 of protecting logic of an integrated circuit from reset deprivation attacks at power-up, carried out according to the principles of the disclosure. At least a portion of the method 500 can be carried out by a DRDC as disclosed herein. The method 500 begins in a step 505.

In a step 510, a power-up signal to power-up a power domain of the integrated circuit is received. The power-up signal can be from a controller of the integrated circuit, such as a SoC controller.

In a step 520, an output value from an array of memory elements is compared to a fixed value. The array of memory elements can be a PAME such as discussed in FIG. 1. The array of memory elements can be part of a DRDC and the comparing can be performed by combinational logic of the DRDC. The DRDC can be dedicated to the power domain or be a DRDC for multiple power domains of the integrated circuit.

In a step 530, a reset status based on the comparison of step 520 is generated. The reset status can be a secure reset status or an unsecure reset status. When the reset status is secure, the output value is a reset value that is the same as the fixed value and indicates the logic of the power domain was reset after power-up. The output value is the reset value when the array of memory element receives a reset signal. The reset signal can be the same reset signal used to reset the logic of the power domain after power-up. When the reset status is unsecure, the output value and the fixed value are different and this indicates the logic of the power domain was not reset after power-up.

In a step 540, the reset status is employed to control access to the logic of the power domain. The reset status can control access via a logic element or combinational logic. Controlling the access includes prohibiting an attacker from causing the logic to function in a non-secure state and preventing the attacker from making unauthorized access of the logic when the reset status is unsecure. The method 500 ends in a step 550.

FIG. 6 and FIG. 7 illustrate examples of combinational logic that can be employed for comparing the fixed value to the output value of the array of memory elements of a DRDC as disclosed herein. FIG. 6 and FIG. 7 illustrate comparators 600 and 700 where n is four. For example, the combinational logic of FIG. 6 or FIG. 7 can be employed in the combinational logic 420. Comparator 600 includes four Exclusive-OR gates 610 and a NOR gate 620.

Comparator 700 of FIG. 7 includes combinational logic wherein the fixed value is ingrained in the combinational logic. As such, the fixed value is not an explicit input such as shown in FIG. 7. Instead the combinational logic is based on the specific bit pattern expected upon reset. As the output value is compared with the fixed value, synthesis may be employed to optimize the comparator 700. For example, all the bits that are expected to be a "1" upon receiving reset are driving inputs to AND Gate-1 710 and all the bits expected to be a "0" upon reset are driving inputs to NOR Gate-2 720. The output of AND Gate-1 710 and NOR Gate-2 712 are driving the final AND Gate-3 730 that provides the reset status.

The disclosure determines whether a chip, or a portion of a chip, received a reset after power-up before allowing further operations on the chip or portion of the chip. The reset status helps prevent the operations on the chip from relying on uninitialized and hence non-secure information to perform secure operations. A DRDC is used to determine the reset status. The reset status generated by the DRDC can be used to prevent the chip from relying on uninitialized and hence non-secure information to perform operations. Advantageously, the disclosed DRDC uses existing digital logic and does not require a special very large scale integration (VLSI) cell design. The DRDC is also immune to process, voltage, and temperature (PVT) variations as well as voltage scaling, such as dynamic voltage frequency scaling (DVFS). Since in at least one embodiment the disclosure uses the exact principle that a hacker exploits in the original problem and turns it against the hacker, the disclosure provides a solution that does not become susceptible to any new attack vectors. While attempting to solve the original problem, as earlier attempts try to add additional vectors, the attempts open doors to other attacks (e.g. slew rate). These then break their solution and manage to again exploit the original problem. With the DRDC, no new vector is added. Instead, the exact attack vector is inverted and used to protect against the attacker. Hence the DRDC solution is not susceptible to new attack vectors while solving the original problem.

The DRDC can ensure chips are secure from attacks involving reset deprivation upon power up. The security provided by the DRDC helps protects RoT in absence of which, even extremely secure measures (e.g. secure hash algorithms (SHA), hash-based message authentication code (HMAC), etc.) that are based on RoT and expected to expand the security perimeter, fail as they do not have a reliable RoT to start from. Various secure and secret assets in a chip, including customer keys stored in fuses are susceptible to such form of attack and can be protected using DRDC.

Those skilled in the art to which this application relates will appreciate that other and further additions, deletions, substitutions and modifications may be made to the described embodiments.

What is claimed is:

1. A digital reset detector circuit for an integrated circuit, comprising:
   a parallel array of memory elements, wherein each of the memory elements has a data output, a data input, and a reset input, wherein the data input and the data output of each memory element are directly connected, and wherein the memory elements are arranged to provide a reset value at the data outputs of the memory elements in response to receiving a reset signal at the reset inputs; and
   combinational logic having a first input for receiving the reset value and a second input connected to a fixed value, wherein the combinational logic provides a first output value indicating a secure reset status when the reset value and the fixed value are the same, and the combinational logic outputs a second output value indicating an unsecure reset status when the reset value and the fixed value are not the same.

2. The digital reset detector circuit as recited in claim 1 wherein a number of the memory elements and a number of bits of the fixed value are both n.

3. The digital reset detector circuit as recited in claim 2 wherein n is selected based on entropy requirement for the integrated circuit to be considered secure.

4. The digital reset detector circuit as recited in claim 1 wherein n is selected to account for any technology bias of the memory elements to drive to a zero or to a one.

5. The digital reset detector circuit as recited in claim 1 wherein the array of memory elements includes a first set of memory elements configured to provide a value of one in response to receiving the reset signal and a second set of memory elements are configured to provide a value of zero in response to receiving the reset signal.

6. The digital reset detector circuit as recited in claim 5 wherein the first and second set of memory elements are arranged in a parallel order wherein the output values of the ones and the zeros provide the reset value that matches the fixed value.

7. The digital reset detector circuit as recited in claim 1 wherein the reset value and the fixed value, each have an equal number of ones and zeros.

8. The digital reset detector circuit as recited in claim 1 wherein the memory elements are resettable memory elements.

9. The digital reset detector circuit as recited in claim 1 wherein the memory elements are D flip-flops.

10. The digital reset detector circuit as recited in claim 1 wherein the first output value of the combinational logic indicates that a reset was received after a power up of a power domain of the integrated circuit.

11. The digital reset detector circuit as recited in claim 1 wherein the memory elements and the combinational logic are conventional digital logic devices.

12. The digital reset detector circuit as recited in claim 1 wherein the digital reset detector circuit is independent of technology nodes.

13. The digital reset detector circuit as recited in claim 1 wherein the digital reset detector circuit is located outside of a JTAG circuit of the integrated circuit.

14. The digital reset detector circuit as recited in claim 1 wherein the combinational logic is a comparator.

15. The digital reset detector circuit as recited in claim 1 wherein the memory elements are clocked memory elements.

16. An integrated circuit, comprising:
    circuitry within a power domain of the integrated circuit and configured to perform a function;
    a secure memory element configured to control access to the circuitry, the secure memory element having a security output and a reset input configured to receive a reset signal;
    a protection logic element having a first input coupled to the security output of the secure memory element and a protection output coupled to the circuitry; and
    a digital reset detector circuit, comprising:
        a parallel array of memory elements, wherein each of the memory elements has a data output, a data input, and a reset input, wherein the data input and the data output of each memory element are directly connected, and wherein the memory elements are arranged to provide a reset value at the data outputs of the memory elements in response to receiving the reset signal at the reset inputs; and
        combinational logic having a first input for receiving the reset value, a second input connected to a fixed value, and an output coupled to a second input of the protection logic element, wherein if the fixed value is the same as the reset value, the combinational logic provides a reset status at the output that indicates that the reset signal was received after a power up of the power domain.

17. The integrated circuit as recited in claim 16 wherein the protection logic element is an AND gate.

18. The integrated circuit as recited in claim 16 wherein the secure memory element is a D flip-flop.

19. The integrated circuit as recited in claim 16 wherein the reset signal is an expected reset signal for the secure memory element.

20. The integrated circuit as recited in claim 16 wherein the circuitry is logic circuitry that forms the Roots of Trust (RoT) for the integrated circuit.

21. A method of protecting logic of an integrated circuit from reset deprivation attacks at power-up, comprising:
- receiving a power-up signal to power-up a power domain of the integrated circuit;
- comparing an output value from an array of memory elements of a digital reset detector circuit to a fixed value wherein each of the memory elements has a data output, a data input, and a reset input, wherein the data input and the data output of each memory element are directly connected; and
- generating a reset status based on the comparing, wherein the reset status indicates the logic was reset after power-up when the output value and the fixed value are the same, and the reset status indicates the logic was not reset after power-up when the output value and the fixed value are different.

22. The method of claim 21, wherein each of the memory elements is a D flip-flop.

\* \* \* \* \*

UNITED STATES PATENT AND TRADEMARK OFFICE
CERTIFICATE OF CORRECTION

PATENT NO. : 10,671,763 B2
APPLICATION NO. : 16/214689
DATED : June 2, 2020
INVENTOR(S) : Padmanabham Patki

Page 1 of 1

It is certified that error appears in the above-identified patent and that said Letters Patent is hereby corrected as shown below:

In the Specification

In Column 3, Line 31, after --number of-- delete "0s and is" and insert --0s and 1s--

Signed and Sealed this
Eighteenth Day of August, 2020

Andrei Iancu
*Director of the United States Patent and Trademark Office*